(12) United States Patent
Gustafson (10) Patent No.: US 10,834,979 B1
(45) Date of Patent: Nov. 17, 2020

(54) FINGER BURN PROTECTION STRAP (71) Applicant: Charles B. Gustafson, Littleton, CO (US)

(72) Inventor: Charles B. Gustafson, Littleton, CO (US)

(73) Assignee: Charles B. Gustafson, Littleton, CO (US)

(*) Notice: Subject to any disclaimer, the term of this patent is extended or adjusted under 35 U.S.C. 154(b) by 0 days.

(21) Appl. No.: 16/929,832

(22) Filed: Jul. 15, 2020

Related U.S. Application Data (60) Provisional application No. 62/921,906, filed on Jul. 15, 2019.

(51) Int. Cl.
*A41D 13/08* (2006.01)
*A47J 45/10* (2006.01)

(52) U.S. Cl.
CPC ............ *A41D 13/087* (2013.01); *A47J 45/10* (2013.01)

(58) Field of Classification Search
CPC ........ A41D 19/01529; A41D 19/01517; A41D 19/01547; A41D 13/087; A45D 2001/002; A45D 2006/005; A45D 29/22; A47J 45/10
USPC ............. 2/16, 20, 21, 161.6, 163; 602/5, 22; 132/285
See application file for complete search history.

(56) References Cited

U.S. PATENT DOCUMENTS

| | | |
|---|---|---|
| 1,388,618 A | 8/1921 | Stein et al. |
| 1,761,356 A | 6/1930 | McNamara |
| 2,039,530 A | 5/1936 | Hatch |
| 2,269,048 A * | 1/1942 | Wright ................. A41D 13/087 2/20 |
| 3,246,338 A | 4/1966 | Miller |
| 4,460,113 A | 7/1984 | Nicklous |
| D405,557 S | 2/1999 | Lindsay |
| 6,038,697 A | 3/2000 | Kasarnich |
| 6,925,653 B1 | 8/2005 | King |
| 7,296,300 B2 | 11/2007 | Votolato |

(Continued)

FOREIGN PATENT DOCUMENTS

| | | |
|---|---|---|
| CA | 2538432 A1 | 3/2006 |
| CN | 2525825 Y | 12/2002 |

(Continued)

OTHER PUBLICATIONS https://www.aliexpress.com/i/4000036055881.html—Kitchen Cooking Silicone Heat Resitant Hot Pot Holder Pad Potholder Oven Mitt Pinch Grip Claw grip.

*Primary Examiner* — Katherine M Moran
(74) *Attorney, Agent, or Firm* — Patricia C. Brzostowicz; Superior Patent Group, LLC (57) ABSTRACT

A strap approximately one-inch wide lines the inner hand extending between the tip of the thumb to the tip of the index finger used to pinch, twist, or grip and hold hot items. A loop for insertion of the thumb at one end and a loop for insertion of the index finger at the opposite end of the strap secure the strap to the hand. A third loop extends perpendicular form the middle edge of the thumb loop to insert the ring finger creates tension that holds the thumb firmly in its loop. Loops for insertion of the three finger digits (thumb/distal phalanx and fingers/distal phalange) are adjustable to fit the varying sizes of a human hand. A matted nap or pile material similar to the friction of human skin (under side of suede) faces hot items handled or manipulated by the strap on hand.

20 Claims, 6 Drawing Sheets

(56) References Cited

U.S. PATENT DOCUMENTS

| | | | | |
|---|---|---|---|---|
| 7,854,714 B1* | 12/2010 | Weber | ............ | A61F 5/0118 |
| | | | | 602/22 |
| 9,883,760 B2* | 2/2018 | Jeong | ............ | A47G 21/001 |
| 2015/0237995 A1* | 8/2015 | Finch | ............ | A45F 5/00 |
| | | | | 294/25 |

FOREIGN PATENT DOCUMENTS

| | | |
|---|---|---|
| CN | 201025894 Y | 2/2008 |
| CN | 205813651 U | 12/2016 |

* cited by examiner

FINGER BURN PROTECTION STRAP

CROSS REFERENCE APPLICATIONS

The present non-provisional application claims priority to provisional application No. 62/921,906 filed Jul. 15, 2019 which is incorporated herein by reference in its entirety.

FIELD

The present disclosure relates a to strap providing burn protection for fingers during the process of pinching and or twisting a hot object between said fingers.

BACKGROUND

Conventional methods to protect a hand from burns when turning a kebob placed over a heat source such as a barbeque grill or grill rack employ the use of tongs, oven mitts, or specialty gloves made of material capable of withstanding high heat. Tongs are a way to rotate a kebob but not designed to twist a kebob by its handle. Mitts and specialty gloves have too much bulk to provide the dexterity needed to twist or spin an object such as thin hot skewer handle and be a convenient size to accompany packaged items needing burn protection involving the action of twisting and handling a skewer or similar object situated just above a grill flame or nested in a kebob rack.

Multiple finger protection devices have been designed to protect finger digits from various hazards. Many of these designs included those disclosed in U.S. Pat. No. 405,557, U.S. Pat. Nos. 3,246,338, 4,460,113, 7,296,300, and 6,038, 697 do not adequately and simultaneously provide dexterity along with protection from heat specifically for the thumb and index finger. Other devices include those that protect multiple fingers in a single pouch, top portion designed to fit four fingers excluding thumb and bottom portion roughly the triangularly shaped for thumb, and are made of silicone such as sold by AliExpress under "Kitchen Cooking Silicone Heat Resistant Hot Pot Holder Pad Potholder Ove Mitt Pinch Grip Claw grip" name. These designs are bulky and don't provide manual dexterity. What is needed is a device that provides finger burn protection while having the dexterity and grip capability of bare fingers to perform a pinch and twist maneuver between the thumb and forefinger while efficiently packaged with objects needing said burn protection.

SUMMARY

What is needed is a device that provides the thumb and index finger burn protection with the dexterity and grip capability similar to that of bare fingers performing a pinch and twist maneuver. The device needs to have less bulk than a glove yet securely attaches to a wide range of finger sizes while providing control during the action of pinching and or twisting a thin hot and often cylindrical shaped skewer, part, or tool.

The present disclosure provides a fire-resistant strap, approximately one inch wide on its short side, having a loop at one end fixed to the thumb distal phalanx area. Said strap follows the contour of the hand from the thumb ending at the tip of the index finger where a second loop is fixed to the distal phalange area of the finger.

Another aspect of the present disclosure provides a third loop extending perpendicular from the underside of the thumb loop opening for insertion of the middle or ring finger distal phalange. Said loop creates tension forcing the thumb securely into its respective loop which enhances dexterity of the device during the action of pinching, twisting, or holding a hot skewer or tool device.

Another aspect of the present disclosure utilizes the mated ruff underside of a material such as suede to provide the friction needed to grip and manipulate an object being held or twisted between the thumb and forefinger. There are other products that would efficiently replace suede such as heat resistant Silicone or Aramid/Nomex, being strong heat resistant materials, formed to produce the grip and dexterity needed to twist a skewer.

Another aspect of the present disclosure provides a widened range of index finger/forefinger sizes firm attachment to the strap by having an adjustable loop to wrap or tie the forefinger at the end of the strap opposing the thumb loop end of the strap thereby adding dexterity.

Another aspect of the present disclosure provides perforated holes beyond the straps stitching leading to the thumb loop for tying a piece of fire-resistant thread/string to adjust the thumb loop size to fit a smaller thumb.

Another aspect of the present disclosure provides a thin, flat, flexible device having limited bulk and appropriate dimensions giving the option to efficiently package it with other devices such as skewers or BBQ racks for the prevention of burns to the thumb and index finger.

In summary, the following disclosure describes a finger burn protection device comprising: a) a rectangular strip, wherein the rectangular strip is formed from at least one rectangular portion of a flexible material, wherein the rectangular strip is fitted together to form an upper layer and a lower layer of substantially the same length and permanently attached together in a manner such that a thumb opening is formed on a left end, the thumb opening comprising approximately at least about one-quarter of the length of the device; b) a second strip of a flexible material having at least one end, wherein the end is adhered to a back side of the bottom layer on the left end of the rectangular strip such that a finger strap is formed; and c) a third strip of a flexible material originating from opposite sides of the right end of the rectangular strip, a first end of the third strip originating from a front side and a second end of the third strip originating from the back side of the rectangular such that an index finger loop is formed over the upper layer. The thumb opening may comprise at least one-fourth of the length of the device. The thumb opening may comprise at least one-third of the length of the device, or may comprise approximately half of the length of the device. Further the thumb opening, may be narrower on one side than the other.

The index finger loop may be formed from two separate strips of flexible material having means to be semi-permanently attached to each other to form the index finger loop. The means to semi-permanently attach the two separate strips of flexible material may be a heat resistant Velcro being a hook and loop fastener means. Alternately, the means to semi-permanently attach the two separate strips of flexible material is via tying a knot. The finger burn protection may be formed of a flexible material which is heat resistant. Further the flexible material may have a gripping surface with a nap or pile finish.

The finger protection device may be a mirror image of the device described above. Further, it may have additional means to minimize the thumb opening, wherein the additional means may be multiple holes and flexible material with knots tied therein.

The finger protection device may be formed from a single cut piece or multiple pieces including two, three, or four or more multiples pieces. The material may be suede or other heat resistant natural material with nap or pile.

Further, a method of manufacture of a finger protection device is presented herein. The method may comprise steps of: a) forming a rectangular strip having an opening at a left end for a thumb to fit therein, the opening comprising at least one-fourth of the length of the rectangular strip, the rectangular strip having an upper and lower side; b) forming a loop on a back lower left side of the rectangular strip where the thumb fits therein, to make a first strap; and c) forming a loop extending from a right front side of the rectangular strip to a right back side of the rectangular strip to form a index finger loop over an upper side of the device.

The method may further comprise the step of forming the index finger loop with two strips of material having semi-permanent attachment means. The semi-permanent attachment means for two strips of material may be heat-resistant Velcro being a hook and loop fastener means. The thumb opening may be made narrower at one side, being a front side, than a back side.

Inasmuch the following is disclosed being a heat protection device comprising: a) a double-sided rectangular strip having an opening at one end for a thumb to pass therethrough; b) a strap for a finger extending down from the one end where the thumb passes through; and c) a loop for a finger looping over the top of the rectangular strip at the opposite end from where the thumb passes through.

Before explaining the disclosed embodiments of the present disclosure in detail, it is to be understood that the disclosure is not limited in its application to the details of the particular arrangement shown, since the disclosure is capable of other embodiments. Also, the terminology used herein is for the purpose of description and not of limitation.

DETAILED DESCRIPTION OF THE DRAWINGS

Figure 1:
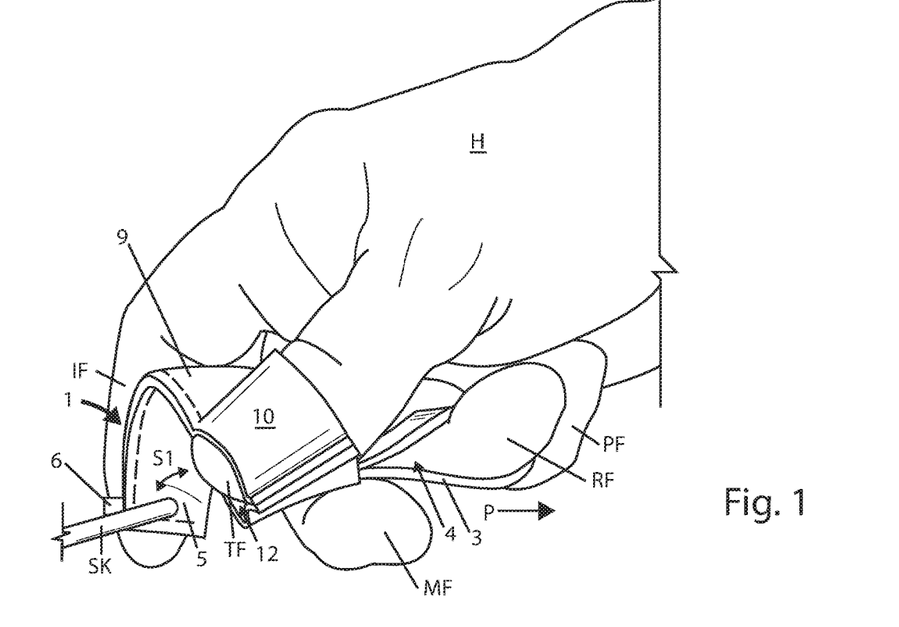
FIG. 1 is a side perspective view of a hand fitted with a finger guard of the present disclosure.
Figure 2:
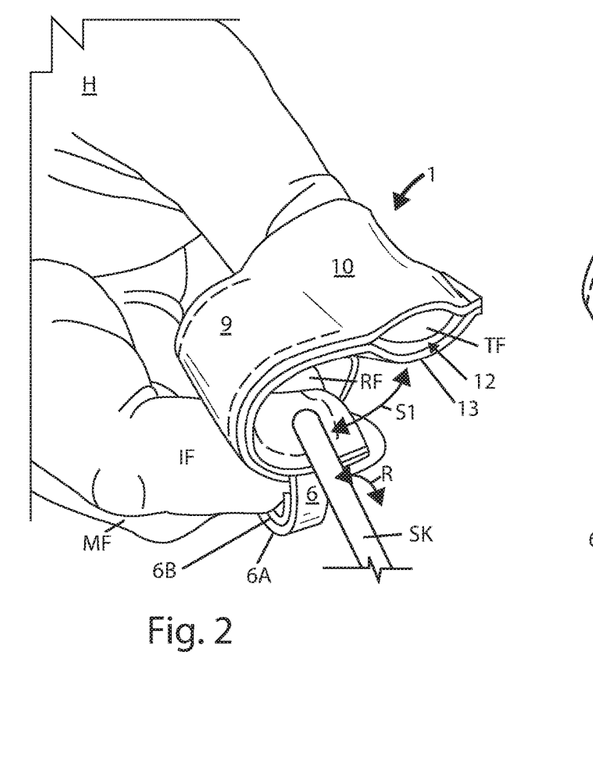
FIG. 2 is a top front perspective view of a hand fitted with a finger guard of the present disclosure.

FIGS. 1 and 2 illustrate the finger guard 1 as it fits on a hand designated H. Finger digits are designated as follows including TF for the thumb, IF for the index finger, MF for the middle finger, RF for the ring finger, and PF for the pinky finger. For the present disclosure, a finger or digit may be any one of an appendage on a hand. When laid out flat with palm facing down, on a right hand the thumb TF in most circumstances is the left most distant finger or digit. The next digit or finger to the right of the thumb is designated the index finger IF. The middle finger MF is the right of the index finger IF. The right finger RF is to the right of the middle finger MF. The pinky finger PF is to the right of the ring finger RF. On the left hand when the palm is facing down and out flat, the thumb TF is the right most digit. To the left of the thumb TF is the index finger IF. To the left of the index finger IF is the middle finger MF. To the left of the middle finger MF is the ring finger RF. To the left of the ring finger RF is the pinky finger PF.

In FIG. 1 and FIG. 2, and for purposes of the present disclosure the device 1 is shown on a right hand, but may be designed in a mirror image of itself to be used on or with the left hand. Now referring to FIGS. 1 and 2 for a right-hand drive, preferably the thumb TF, or alternately ring finger RF, fits into the finger guard 1 at one end into a thumb loop 10 created by at least one strip of fabric or other flexible material stitched, or otherwise attached, together. The thumb loop 10 may comprise at least twenty percent of the length of the device, or at least twenty-five percent or one-fourth, or at least thirty percent or one-third, or at least forty percent, or at least fifty percent of the length of the device. Preferably an index finger IF, or alternatively a middle finger MF, fits into an index finger loop 6 positioned at the opposite end of the device from the thumb loop 10. Preferably, the ring finger RF, or alternatively a middle finger MF, fits into a ring finger strap 3 which helps provide leverage and secures the finger guard 1 in place.

Means to increase or decrease the thumb loop 10 size may be employed such as providing holes or openings in the middle portion, or mid-portion 9 and additional string, thread, or straps to narrow the thumb loop 10 opening, shown and described below in FIGS. 10A, 10B. Alternately buttons, snaps, Velcro being a hook and loop fastener means or other means of attachment may serve to provide options for having an adjustable size thumb loop opening. The thumb loop 10 may have varying diameter at the front and the back of the device provided for by stitching as illustrated in FIGS. 1 and 2, wherein the front may be more narrow to hold the tip of the thumb firm in place. The finger guard device 1 may be at least two inches in length, length being the long sides of the roughly rectangular device, or at least two and half inches in length, or three inches in length, or four inches in length, or at least five inches in length or more to accommodate varying sizes of hands. The width of the finger guard device, being the short sides of the roughly rectangular device, may be at least one-half inch, or at least one inch, or at least one and a half inches, or at least two inches. The ring finger strap 3 may be at least one-fourth inch in length when folded over on itself, or at least one-third inch in length when folded, or at least one-half inch when folded, or at least three-fourths inch when folded, or at least one inch, or at least one and a half inches when folded. The index finger loop 6 may be at least one-half inch in length, or at least one inch in length, or at least one and a half inches in length.

The fabric or other flexible material forming the finger guard 1 for instance may be any natural or synthetic material, woven or non-woven. The fabric or flexible material may have some nap or pile on the outer side, i.e. the side that faces out, is on the surface, being the user surface or gripping surface, i.e. where the device grips or comes in contact with a tool, skewer, or other hot object, of the finger guard 1 when in use, that increases friction between the material itself or the material and another object, such as a hot skewer SK. Examples of higher nap materials may be synthetic or natural suede, velvet, moleskin, or felt. Nap or pile may be defined as the raised or fuzzy portion of the fabric, and may be described as having napped finish. Further, the fabric or flexible material used to create the finger guard may have some heat resistant qualities. Example of heat resistant material having thermal insulation properties may include suede, leather, and or fabric composite materials or fabric with coatings including composite material such as neoprene, silicone, aramid, ceramics, and refractory. In addition silica fabric and textiles, an example being aramids, are heat resistant fabrics. Heat resistance and nap may be a property of the material or fabric or coating of the material or fabric used to form the finger guard 1 disclosed. A natural suede may be utilized to provide a more custom fit, wherein the suede may be soaked in water, and/or a hardening chemical such as a water-starch mixture and then fitted to the hand that may when allowed to dry. Following removal from water and/or hardening chemical, the suede may retain shape and size to form fit a particular hand.

Various methods may be employed to fabricate the finger guard 1 wherein pieces are cut from the fabric or material with scissors or other cutting devices or punched from the fabric or material with a pre-formed shaped mold cutter. It is envisioned that the loops or straps may be cord or string like material or of the same material as the whole device. The various pieces may be stitched or held together with known methods including stitching, sewing, via hand or with machine, adhesive, buttons, snaps, Velcro being a hook and loop fastener means or other known methods. String or thread for stitching or sewing, buttons, snaps, adhesive, and Velcro being a hook and loop fastener means may also have heat resistant properties. Common materials that are heat resistant may include silicone, aramid, or Nomex®, being strong heat resistant materials. Thread or stitching material used to sew or stitch the device may also be heat resistant such as Kevlar®, Nomex®, nylon, and polyester, as non-limiting examples, being strong heat resistant materials.

As shown in FIGS. 1 and 2, a squeeze motion S1 enables the user to grip and twist, between thumb loop 10 and thumb loop bottom strip 13 (FIG. 2) and index finger grip 5, a hot item or tool, such as a skewer SK, without burning the user's fingers. As shown in FIG. 2, a rotation motion is designated R and used to turn a tool or skewer SK or perform other desired functions such as moving the tool or skewer from one place to another. Because the finger guard 1 is small and compact as compared to other means of heat and burn protection, such as an oven mitt or other finger protection devices that cover the whole finger(s), finger dexterity is maintained when using the finger guard 1. As shown in FIG. 1, a pulling motion P by the ring finger RF fitted with the ring finger strap 3 enables additional control. The pulling action P caused by spreading fingers MF and RF of the hand H, force the thumb TF to slide into position to the extent that the tip of the thumb is slightly protruding out of the far side thumb loop interior 12 of thumb loop 10.

Figure 3:
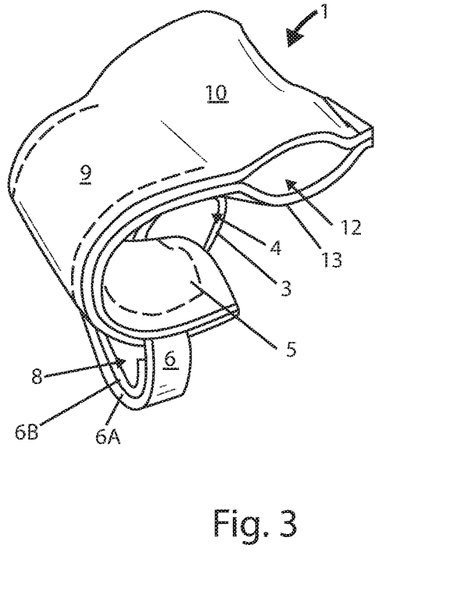
FIG. 3 is a top front perspective view of a finger guard of the present disclosure.

FIG. 3 illustrates the finger guard 1 with thumb loop 10, thumb loop space or interior 12, thumb loop bottom strip 13, mid-portion 9, index finger grip 5, index finger loop 6, ring finger strap 3, with space for ring finger 4. In one embodiment 1 the index finger loop 6 may be formed of two pieces of fabric or material 6A, 6B that include semi-permanent attachments including but not limited to Velcro being a hook and loop fastener means, snaps, buttons, or additional length to tie the ends together, such as in a knot, to create the index finger space 8 in the index finger loop 6 to account for different sizes of fingers. The Velcro being a hook and loop fastener means, snaps, buttons and any fabric or material used to manufacture the finger guard 1 may be heat resistant. Examples of heat resistant silicone, neoprene, ceramics, and aramids, as well as others. In yet another embodiment the index finger loop 6 is one piece as will described below. Regardless of configuration of the index finger loop 6, index finger space 8 is formed to receive an index finger (not shown).

Figure 4:
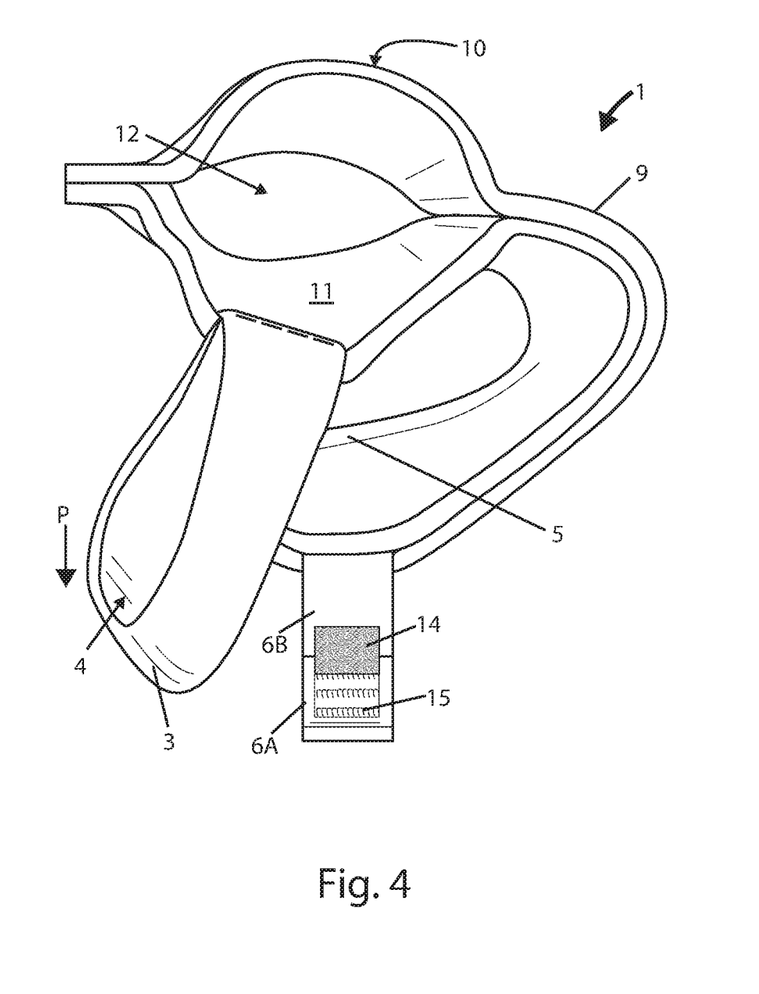
FIG. 4 is a back view of a finger guard of the present disclosure.

FIG. 4 illustrates the back side of the finger guard 1 with thumb loop 10, thumb loop space 12, interior side of thumb loop 11, mid-portion 9, index finger grip 5, index finger loop 6, ring finger strap 3, with space for ring finger 4. This embodiment illustrates the index finger loop 6 with sides 6A, 6B that are separate pieces and include semi-permanent attachments being Velcro, being a hook and loop fastener means, mating sides 14, 15 to hold the sides 6A, 6B together forming an index finger interior space 8.

Figure 5:
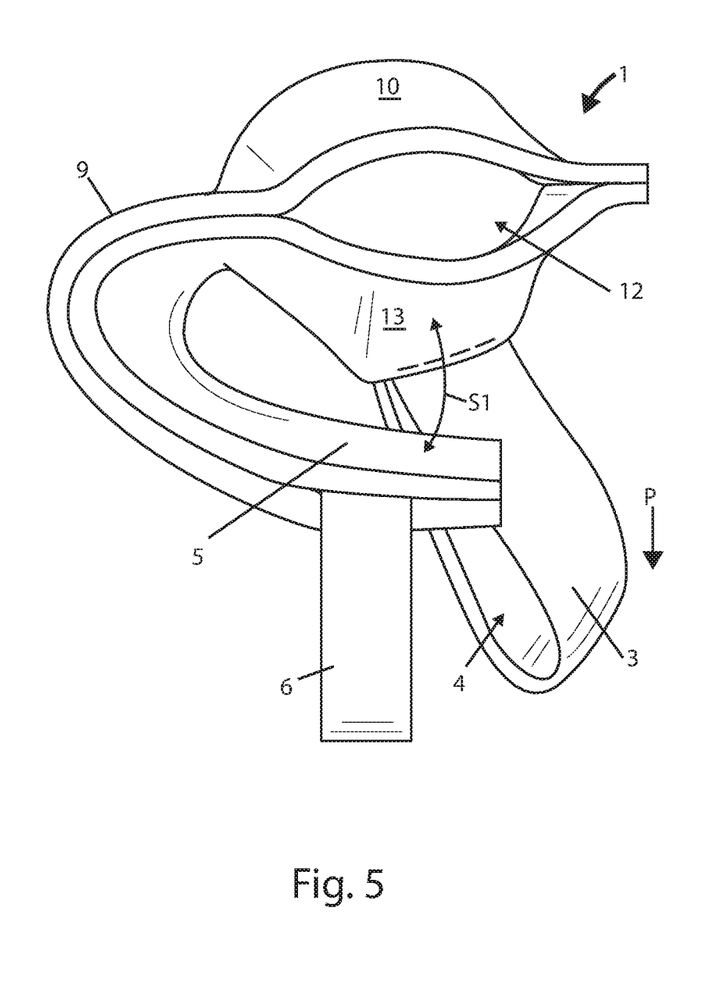
FIG. 5 is a front view of a finger guard of the present disclosure.

FIG. 5 illustrates the back side of the finger guard 1 with thumb loop 10, inside of thumb loop 12, thumb loop bottom or gripping side 13, mid-portion 9, index finger grip 5, index finger loop 6, ring finger strap 3, with space for ring finger 4. The thumb loop underside 13 may be moved toward, and/or mated with or nearly mated with, the index finger grip 5 through the squeeze motion S1 to grip a skewer or tool (not shown). As also shown in FIG. 4, a pull motion P enables additional control as described above.

Figure 6:
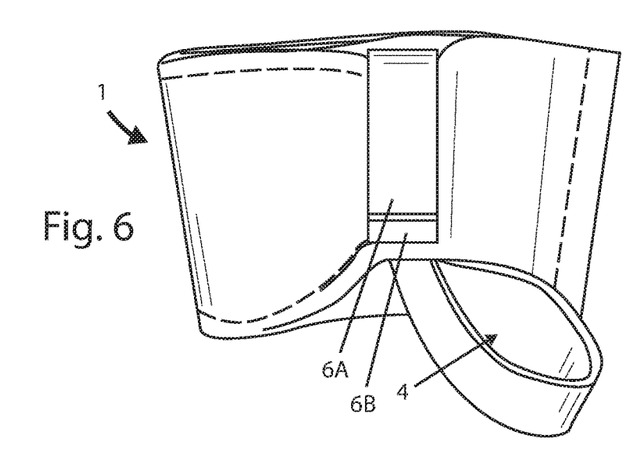
FIG. 6 is a right end perspective view of the outer side of a finger guard of the present disclosure.
Figure 7:
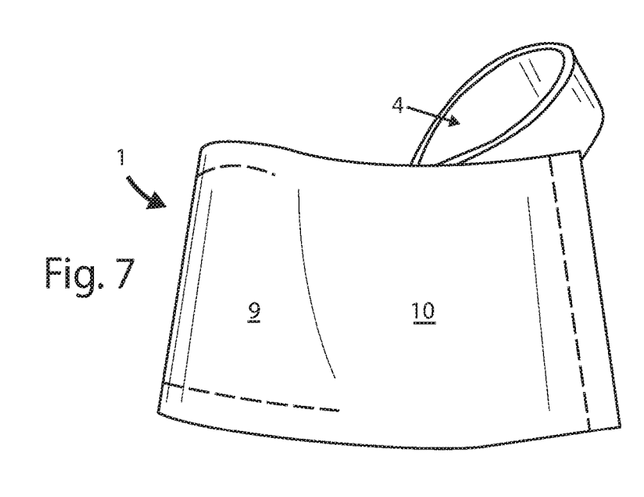
FIG. 7 is a left end perspective view of the inner side of a finger guard of the present disclosure.
Figure 8:
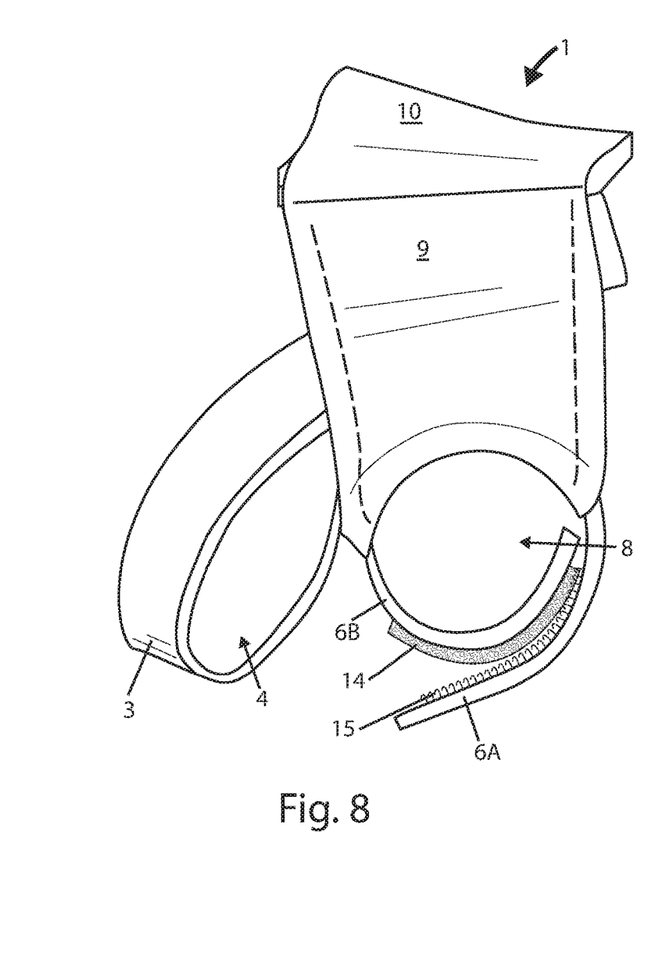
FIG. 8 is a right side perspective view of the finger guard of the present disclosure showing one embodiment of the finger guard wherein an index finger loop is formed by two sides having Velcro being a hook and loop fastener attachment means.

FIG. 6 illustrates the finger guard 1 from the right side view illustrating the index finger loop 6 with sides 6A, 6B that may be adhered to one another to form space for ring finger 4. In FIG. 7, the finger guard device is flipped over to show the left side with the thumb loop 10 and mid-portion 9 as well as space for ring finger 4. FIG. 8 shows a top view from left side of the finger guard 1 with index finger loop 6, and index finger loop sides 6A, 6B forming an index finger space 8. Sides 6A, 6B include male and female mating sides for Velcro being a hook and loop fastener means 14, 15 to semi-permanently attached sides 6A, 6B together at desired place to form index finger space 8 of desired size. The ring finger strap 3 forms a space for the index finger 4. Thumb loop 10 as well as mid-portion 9 are indicated.

Figure 9A:
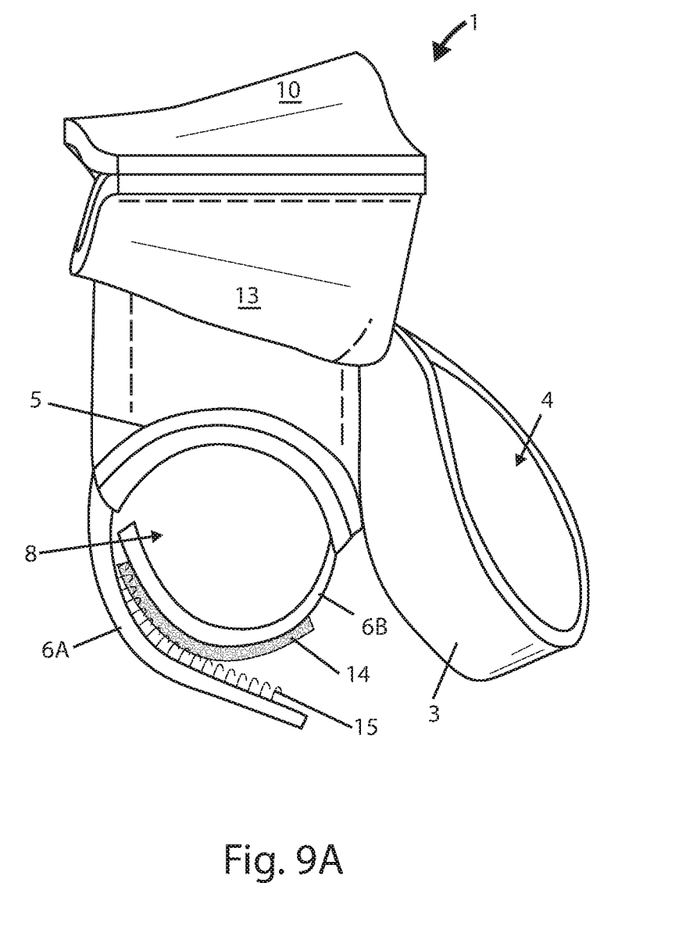
FIG. 9A illustrates the finger guard of the present disclosure showing one embodiment of the finger guard wherein an index finger loop is formed by two sides having Velcro being a hook and loop fastener attachment means.

FIG. 9A illustrates finger guard 1, in an opposite view from FIG. 8, in an embodiment that includes Velcro being a hook and loop fastener means on the index finger loop 6 to hold strap side portions 6A, 6B fitted together with male and female Velcro being a hook and loop fastener means sides 14, 15 to form space 8. The male and female portions 14, 15 may be mated in a semi-permanent manner to fit snugly on an index finger (not shown) of varying sizes. Also shown in the thumb loop 10 and thumb loop underside 13.

Figure 9B:
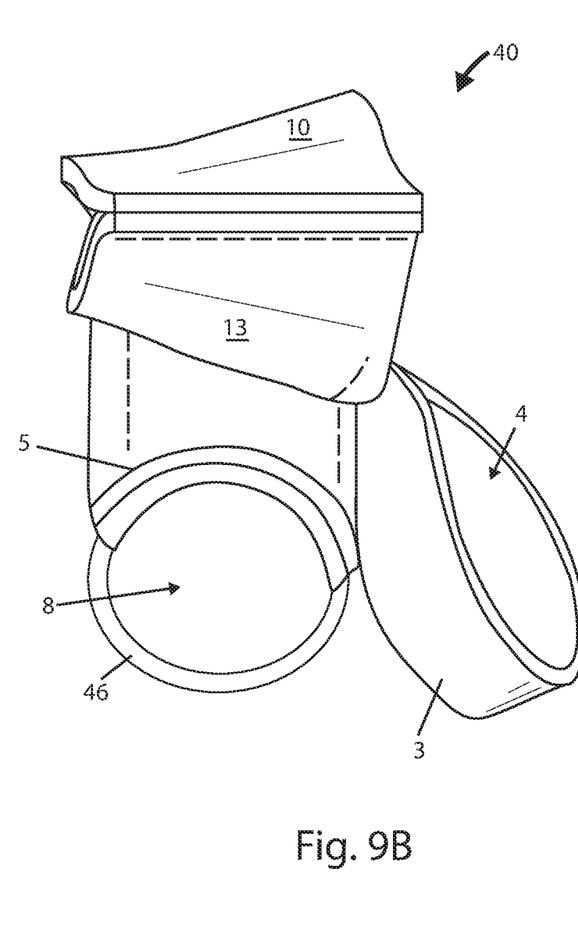
FIG. 9B illustrates the finger guard of the present disclosure showing a second embodiment of the finger guard wherein an index finger loop is formed by a single piece.

FIG. 9B illustrates a second embodiment of the finger guard 40. The index finger space 8 is formed by a single index finger strap 46 being a permanent non-adjustable loop pre-sized to fit index fingers of a predetermined size. Also shown in the thumb loop 10 and thumb loop underside 13, the ring finger strap 3 and space for ring finger 4, as well as index finger grip 5.

Figure 9C:
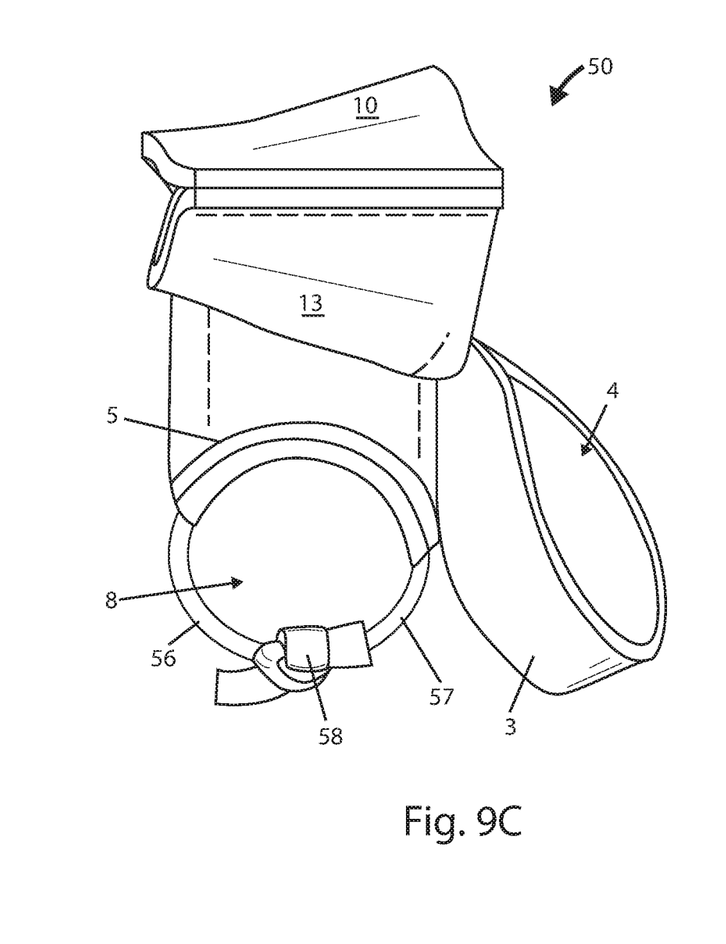
FIG. 9C illustrates the finger guard of the present disclosure showing one embodiment of the finger guard wherein an index finger loop is formed by two sides having a tie means.

FIG. 9C illustrates a third embodiment of the finger guard 50. The index finger space 8 is formed by two pieces 56,57 which may be semi-permanently attached by tying a knot 58 in the ends thereof. Also shown in the thumb loop 10 and thumb loop underside 13, the ring finger strap 3 and space for ring finger 4, as well as index finger grip 5.

Figure 10A:
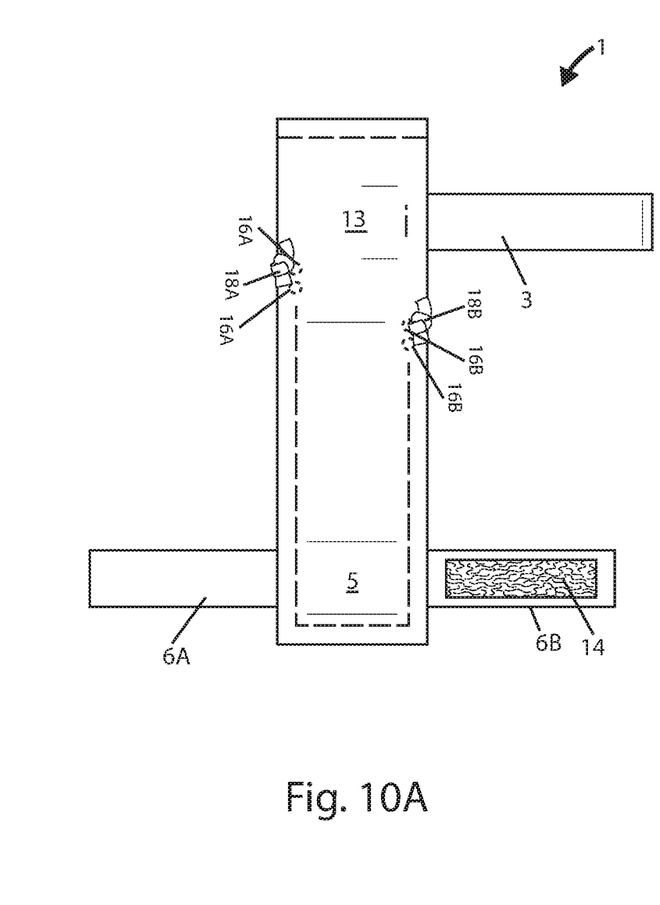
FIG. 10A is a open bottom view of a finger guard embodiment.

FIG. 10A is a bottom perspective view of the finger guard 1 when laid out flat with alternate thumb size limiting device. Index finger sides 6A, 6B have Velcro being a hook and loop fastener means male or female portion 14. That loop around the opposite side of the index finger grip 5. The thumb loop 10 underside or gripping side 13 is visible along with ring finger strap 3. Holes 16A, B serve to receive straps or string wherein the ends may form knots 18A,B to provide a snugger fit to a hand with a smaller-sized thumb. These knots 18A, B provide a means to minimize the size of the thumb loop 10. FIG. 10B is a top perspective view of the finger guard 1 when laid out flat. Index finger sides 6A, 6B have Velcro being a hook and loop fastener means male or female portion 15. The thumb loop 10 and mid-portion 9 is visible as is ring finger strap 3. Holes near the edges 16A,B serve to receive a strap(s) or string knotted 18A, B to make a more secure fit with a smaller thumb thereby reducing the size of the thumb loop 10 and provides means for end user to have this option or not. At least one hole 16A,B, or at least two holes 16A,B, or at least three holes 16A,B, or more could be placed along the edge to provide multiple options for thumb loop 10, 13 sizing. As shown in FIGS. 10A and 10B the thumb loop 10, 13 may made one width at the front side of the device and another width at the back side of the device via stitching. Since the tip of the thumb is generally smaller than the knuckle area making the front portion of the thumb loop, wherein the tip fits into, more narrow provides a more universal device to better fit an individual user.

Figure 10B:
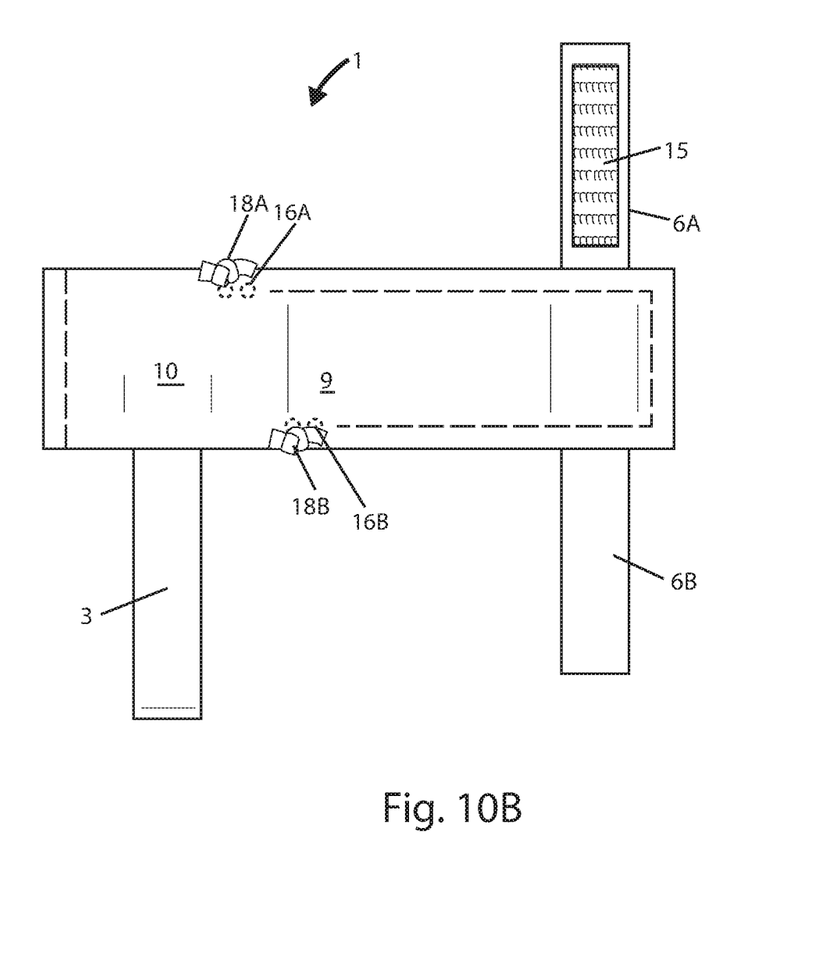
FIG. 10B is a open top view of a finger guard embodiment.

It may be envisioned that the finger protection device 1 of FIG. 10B can be constructed or a single piece of material stamped or cut from in a shape comprising a central rectangle a portion of which may contain the thumb loop 10 on the left side as in FIG. 10B and mid-portion 9, but which extends beyond the index finger loop portions 6A,6B, on the right side, wherein the right side extension folds over upon itself to form the thumb loop 10 therein. The ring finger strap 3 may be formed of a longer rectangular strip folded over on itself as well. The index finger loop may be formed as shown from two rectangular strips 6A, 6B with semi-permanent attachment means being Velcro being a hook and loop fastener means 15. Alternately the device may be formed from separate cut pieces and stitched together.

EXAMPLE

For a right-hand fitting, follow the steps below to use the finger protection device, refer to FIG. 1 for reference.
Step 1. Pinch strap at center or mid-portion 9 as identified in FIG. 1 with left hand.
Step 2. Insert right-hand thumb TF into thump loop 10. It will not be firmly fitted until the last step.
Step 3. Place index finger IF pointing into the index finger loop 6 and pull with left hand still holding the device at mid-point 9 to further insert the forefinger into index finger loop 6. It will again not be totally fitted until the last step.
Step 4. Place ring finger RF in the ring finger strap 3 and open/spread all digits of the entire hand thereby pulling the thumb TF and index finger IF in the thumb loop 10 and index finger loop 6, respectively, such that they are snug and fitted into place. As shown in FIGS. 1 and 2, the thumb TF, extends early to the end, or just to the end or just past the end of the opening of the thumb loop 10. The ring finger strap 3 may sit at approximately, or about at, or a little past, or a little before, the first knuckle from the end of the index finger IF.

This method provides a snug fit for user to protect fingers. The device itself is optimized in design having three points where it fits on the hand creating opposing tension and a snug fit, being the thumb, index finger, and ring finger. To achieve a device that is form fit to a particular hand, the device, if made from suede leather for instance, may be soaked in water for at least one minute, or up to about five minutes to soften the leather. Then, the device is fit on the desired hand and the above steps followed to achieve correct fit for optimal function. Next, remove the device from hand and allow to dry. This will produce a device that is form fit to a particular hand.

Although the present disclosure has been described with reference to the disclosed embodiments and examples, numerous modifications and variations can be made and still the result will come within the scope of the disclosure. No limitation with respect to the specific embodiments disclosed herein is intended or should be inferred. Each apparatus embodiment described herein has numerous equivalents.

The invention claimed is:

1. A finger burn protection device comprising:
   a) a rectangular strip, wherein the rectangular strip has an upper layer and a lower layer of substantially the same length and are permanently attached together forming a thumb opening on a left end, the thumb opening comprising at least one-quarter of the length of the device;
   b) a second strip of a flexible material having at least one end, wherein the end is adhered to a back side and on the lower layer on the left end of the rectangular strip such that a finger strap is formed; and
   c) a third strip of a flexible material originating from opposite sides of a right end of the rectangular strip, such that an index finger loop is formed over the upper layer.

2. The finger burn protection device of claim 1, wherein the thumb opening is at least one-third of the length of the device.

3. The finger burn protection device of claim 1, wherein the thumb opening is approximately half of the length of the device.

4. The finger burn protection device of claim 1, wherein the thumb opening is narrower at a front side of the rectangular strip than at the back side of the rectangular strip.

5. The finger burn protection device of claim 1, wherein the index finger loop is formed from two separate strips of flexible material having means to be semi-permanently attached to each other to form the index finger loop.

6. The finger burn protection device of claim 5, wherein the means to semi-permanently attach the two separate strips of flexible material is by hook and loop means.

7. The finger burn protection device of claim 6, wherein the hook and loop means is a heat resistant material.

8. The finger burn protection device of claim 5, wherein the means to semi-permanently attach the two separate strips of flexible material is a knot.

9. The finger burn protection device of claim 1, wherein the flexible material is heat resistant.

10. The finger burn protection device of claim 1, wherein a gripping surface on an outer side of the bottom layer of the rectangular strip has a napped finish.

11. The finger burn protection device of claim 1, wherein the device is designed for a left-handed person wherein the thumb loop and finger strap is on a right end of the rectangular strip and index finger loop on the left end.

12. The finger burn protection device of claim 1 further comprising a means to minimize the thumb opening.

13. The finger burn protection device of claim 12, wherein the means to minimize the thumb opening is with a flexible material piece fitted through a hole with knots tied on each end.

14. The finger burn protection device of claim 1, wherein the upper and lower layers are separate pieces.

15. The finger burn protection device of claim 1, wherein the flexible material is made from suede.

16. A method of manufacture of a finger protection device, the method comprising the steps of:
   a) forming a rectangular strip having an opening at a left end for a thumb to fit therein, the opening comprising at least one-fourth of the length of the rectangular strip, the rectangular strip having an upper and lower side;
   b) forming a loop, on a back and lower left side of the rectangular strip where the thumb fits therein, to make a finger strap; and
   c) forming a loop extending from a right front side of the rectangular strip to a right back side of the rectangular strip to form an index finger loop over an upper side of the device.

17. The method of claim 16 further comprising the step of forming the index finger loop with two strips of material having semi-permanent attachment means.

18. The method of claim 17, wherein the semi-permanent attachment means is heat-resistant hook and loop means.

19. The method of claim 16 further comprising making the thumb opening more narrow at a front side than at a back side.

20. A finger heat protection device comprising:
   a) a double-sided rectangular strip having a top and a bottom layer and having an opening at one end for a thumb to pass therethrough;
   b) a strap for a finger, the strap extending down from the bottom layer on the one end the thumb passes through; and
   c) a loop for a finger, the loop extending over the top layer of the rectangular strip at the opposite to the one end.

* * * * *